(12) United States Patent
Tsuyama

(10) Patent No.: US 11,244,428 B2
(45) Date of Patent: Feb. 8, 2022

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Kazuya Tsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 16/896,584

(22) Filed: Jun. 9, 2020

(65) Prior Publication Data
US 2020/0388010 A1 Dec. 10, 2020

(30) Foreign Application Priority Data
Jun. 10, 2019 (JP) .............................. JP2019-107827

(51) Int. Cl.
*G06T 5/00* (2006.01)
*G06T 5/20* (2006.01)
*G06T 5/10* (2006.01)

(52) U.S. Cl.
CPC ............... *G06T 5/002* (2013.01); *G06T 5/10* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 8,737,757 B2* | 5/2014 | Hatakeyama | ........... | G06T 5/003 382/260 |
| 2008/0080019 A1* | 4/2008 | Hayashi | ............... | G02B 15/143 358/474 |
| 2008/0095358 A1* | 4/2008 | Eguchi | ...................... | G06T 5/10 380/28 |
| 2009/0195672 A1* | 8/2009 | Ono | ......................... | H04N 5/77 348/231.3 |
| 2009/0201386 A1* | 8/2009 | Ono | ...................... | H04N 5/217 348/222.1 |
| 2010/0079626 A1* | 4/2010 | Hatakeyama | ............. | G06T 5/20 348/241 |

(Continued)

FOREIGN PATENT DOCUMENTS

JP  2006-238032 A  9/2006
JP  2012-128529 A  7/2012

*Primary Examiner* — Andrae S Allison
(74) *Attorney, Agent, or Firm* — Cowan, Liebowitz & Latman, P.C.

(57) ABSTRACT

An image processing apparatus includes a correction unit configured to correct first image data acquired via an image pickup optical system and to generate second image data using a filter generated based on a characteristic of the image pickup optical system, a decomposition unit configured to decompose each of the first image data and the second image data into a first frequency component and a second frequency component, a combination unit configured to combine the first frequency component of the first image data and the first frequency component of the second image data with each other, and a generation unit configured to generate third image data based on a frequency component including the first frequency component combined by the combination unit and the second frequency component of the second image data.

17 Claims, 7 Drawing Sheets

(56) References Cited

U.S. PATENT DOCUMENTS

| | | | |
|---|---|---|---|
| 2010/0079627 A1* | 4/2010 | Ono | H04N 5/3572 |
| | | | 348/241 |
| 2011/0135216 A1* | 6/2011 | Hatakeyama | G06T 5/003 |
| | | | 382/260 |
| 2013/0038749 A1* | 2/2013 | Hatakeyama | H04N 5/217 |
| | | | 348/222.1 |
| 2016/0005151 A1* | 1/2016 | Hatakeyama | G06T 5/20 |
| | | | 348/241 |
| 2016/0343115 A1* | 11/2016 | Kusumi | G06T 5/20 |
| 2019/0108629 A1* | 4/2019 | Horiuchi | G06T 5/20 |

* cited by examiner

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates to an image processing apparatus that improves the quality of a captured image.

Description of the Related Art

In imaging an object with an image pickup apparatus and in obtaining an image, the image is deteriorated and blurred due to the aberrations of an image pickup optical system and the like. One conventional method that improves the quality of the deteriorated image is to use an image restoration filter. Since the image has a noise component, simply using the image restoration filter amplifies the noise component in the image and cannot provide a good image. Accordingly, in order to suppress the amplification of the noise component, for example, one known method suppresses a restoration rate of a high-frequency component in the image based on an intensity ratio between the image and the noise component, like a Wiener filter.

Japanese Patent Laid-Open No. ("JP") 2012-128529 discloses a method that divides a frequency band off an image into a high-frequency component and a low-frequency component, applies a restoration filter having a different recovery rate to each frequency band, and thereby controls a restoration rate for each frequency band. JP 2006-238032 discloses a method of performing image restoration processing by setting a minute spread to a Point Spread Function (PSF) after the image is restored.

The amplitude of the noise included in the captured image differs depending on the ISO speed. Hence, even if the gain amount is the same, the noise amplification amount in the image restoration processing differs depending on the ISO speed. Therefore, the method disclosed in JP 2012-128529 needs to redesign or store the image restoration filter for each ISO speed. The method disclosed in JP 2006-238032 controls the restoration gain for each frequency band, and thus needs to redesign or store, whenever changing the restoration gain, a restoration filter that provides the minute spread to the PSF after the image is restored.

SUMMARY OF THE INVENTION

The present invention provides an image processing apparatus, an image pickup apparatus, an image processing method, and a storage medium, each of which can provide a good image while suppressing an increase in noise with a low processing load.

An image processing apparatus according to one aspect of the present invention includes a correction unit configured to correct first image data acquired via an image pickup optical system and to generate second image data using a filter generated based on a characteristic of the image pickup optical system, a decomposition unit configured to decompose each of the first image data and the second image data into a first frequency component and a second frequency component, a combination unit configured to combine the first frequency component of the first image data and the first frequency component of the second image data with each other, and a generation unit configured to generate third image data based on a frequency component including the first frequency component combined by the combination unit and the second frequency component of the second image data. At least one processor or circuit is configured to perform a function of at least one of the units.

An image processing apparatus according to another aspect of the present invention includes a correction unit configured to correct first image data acquired via an image pickup optical system and to generate second image data using a filter generated based on a characteristic of the image pickup optical system, a decomposition unit configured to decompose each of the first image data and the second image data into a plurality of frequency components, a combination unit configured to combine a frequency component of the first image data and a frequency component of the second image data in each frequency component, and a generation unit configured to generate third image data based on the frequency component combined by the combination unit. At least one processor or circuit is configured to perform a function of at least one of the units. The plurality of frequency components include a first frequency component and a second frequency component that is a frequency component lower than the first frequency component. The combination unit combines the frequency component of the first image data and the frequency component of the second image data such that a ratio of the first frequency component of the second image data to the first frequency component of the first image data is larger than a ratio of the second frequency component of the second image data to the second frequency component of the first image data.

An image pickup apparatus, an image processing method, a program, and a storage medium including or corresponding to each of the image processing apparatus also constitutes another aspect of the present invention.

Further features of the present invention will become apparent from the following description of exemplary embodiments with reference to the attached drawings.

DESCRIPTION OF THE EMBODIMENTS

Figure 1:
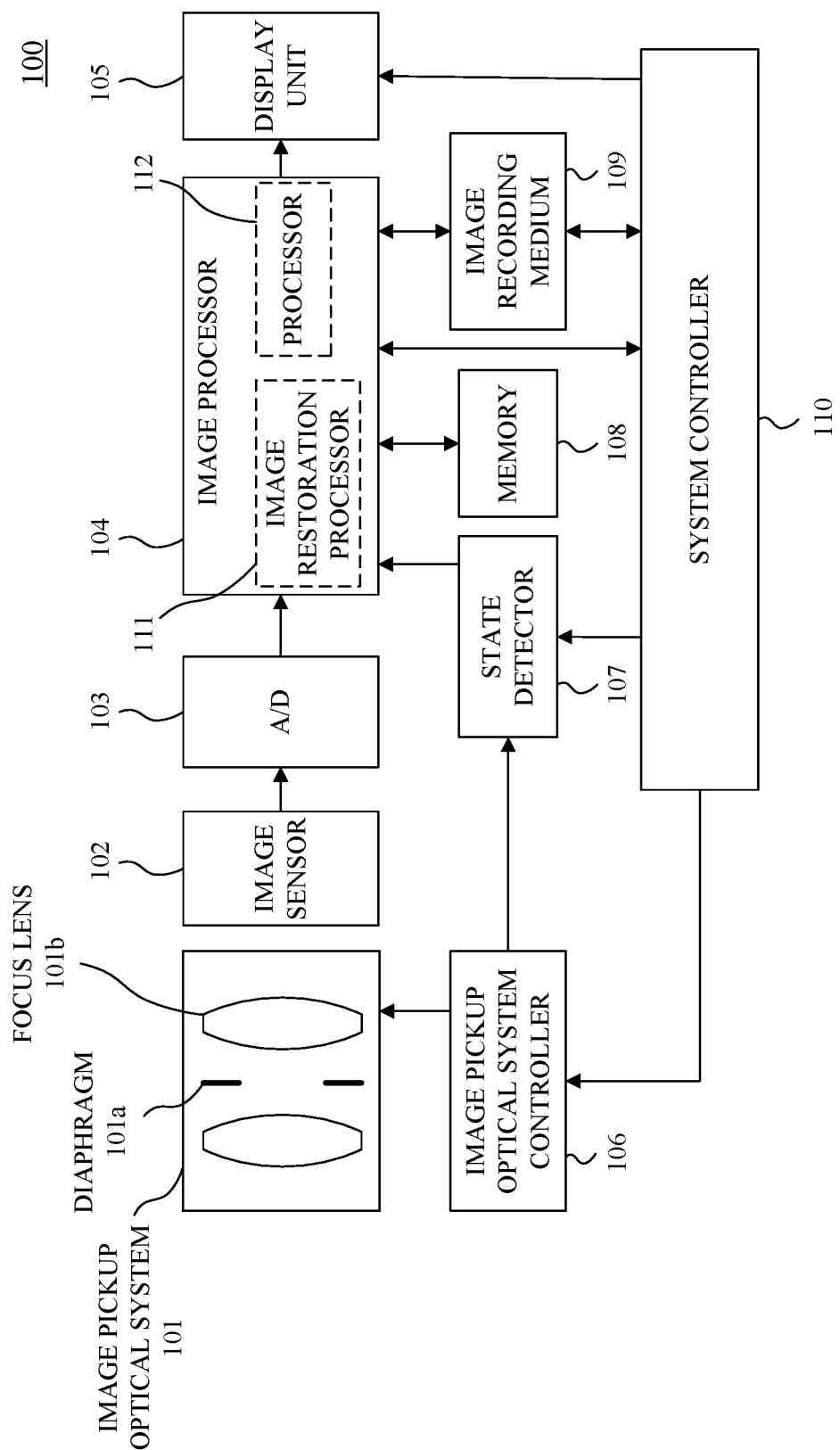
FIG. 1 is a block diagram of an image pickup apparatus according to each embodiment.

Referring now to the accompanying drawings, a detailed description will be given of embodiments according to the present invention.

Generally, when an image is captured by an image pickup apparatus, such as a digital camera, to obtain an image, the image deteriorates to some extent (or the image is deteriorated and blurred) due to the aberrations of an image pickup optical system. A blur component is generated in the image generally due to the spherical aberration, coma, field curvature, astigmatism, and the like of the image pickup optical system. Where there is no aberration and there is no influence of diffraction, a light flux from one point of the object again converges on one point on the imaging surface of the image sensor. On the other hand, if the above aberration exists, light to be imaged again at one point on the imaging surface spreads and forms an image, and causes the blur component in the image.

The blur component generated in an image is optically defined by the PSF. For example, an out-of-focus image is also blurred. Herein, even if the object is in focus, an image blur caused by the aberration of the image pickup optical system will be referred to as a "blur."

OTF (Optical Transfer Function) obtained by Fourier-transforming the PSF is a frequency component of the aberration and is represented by a complex number. The absolute value of the OTF or the amplitude component is referred to as MTF (Modulation Transfer Function), and the phase component is referred to as PTF (Phase Transfer Function).

The amplitude component MTF and the phase component PTF are the frequency characteristics of the amplitude component and the phase component of the image degradation caused by the aberration, respectively. The phase component PTF is expressed as a phase angle as in the following expression (1). In the expression (1), Re(OTF) and Im(OTF) represent a real part and an imaginary part of the OTF, respectively.

$$\text{PTF} = \tan^{-1}\{Im(\text{OTF})/Re(\text{OTF})\} \quad (1)$$

The OTF in the image pickup optical system provides a degradation to the amplitude component and the phase component of the image. Hence, the deteriorated image is in a state where each point of the object is asymmetrically blurred like coma. The lateral chromatic aberration is generated when the imaging position shifts due to the difference in the imaging magnification for each wavelength of light and, for example, when the RGB color components are acquired according to the spectral characteristic. Thereby, the imaging position shifts among the RGB components, as well as the imaging position shifts for each wavelength for each color component. In other words, the image spreads due to the phase shift occurs. To be exact, the lateral chromatic aberration is not simply a color shift caused by the parallel shift, but unless otherwise specified, the color shift will be described as being equivalent to the lateral chromatic aberration.

As a method of correcting the deterioration of the amplitude component MTF and the deterioration of the phase component PTF, for example, one known method is to make a correction using the OTF of an image pickup optical system. This method is called the image restoration or image recovery. In the following description, the processing of correcting the image deterioration using the OTF of the image pickup optical system will be referred to as the image restoration processing or simply referred to as restoration processing.

A description will now be given of an outline of the image restoration processing. Assume that g(x, y) denotes a degraded image, f(x, y) denotes an original image, and h(x, y) is a PSF obtained by inversely Fourier transforming the OTF. Then, the following expression (2) is established. In the expression (2), * indicates a convolution, and (x, y) indicates a coordinate on the image.

$$g(x,y) = h(x,y) * f(x,y) \quad (2)$$

When the expression (2) is Fourier-transformed and converted into a frequency format, the result has a form of a product for each frequency as represented by the following expression (3). In the expression (3), H denotes a Fourier-transformed PSF or the OTF. (u, v) indicates a coordinate on the two-dimensional frequency plane or the frequency.

$$G(u,v) = H(u,v) \cdot F(u,v) \quad (3)$$

In order to obtain the original image from the degraded image obtained by imaging, both sides may be divided by H as represented by the following expression (4).

$$G(u,v)/H(u,v) = F(u,v) \quad (4)$$

The original image f(x, y) is obtained as a restored image by inversely Fourier-transforming F(u, v) in the expression (4) and by returning it to the real surface.

Now assume that R is obtained by inversely Fourier-transforming 1/H in the expression (4). Then, as represented by the following expression (5), the original image can be obtained similarly by performing the convolution processing for the image on the actual surface.

$$g(x,y) * R(x,y) = f(x,y) \quad (5)$$

R(x, y) in the expression (5) is called an image restoration filter. The actual image contains a noise component. Thus, when the image restoration filter generated by the reciprocal of the OTF is used as described above, the noise component is amplified together with the deteriorated image, and a good image cannot be obtained. Accordingly, the following embodiments will describe an image processing apparatus that provides a good image while suppressing an increase in noise with a low processing load.

First Embodiment

Referring now to FIG. 1, a description will be given of a configuration of the image pickup apparatus according to a first embodiment of the present invention. FIG. 1 is a block diagram of the image pickup apparatus 100. The image pickup apparatus 100 performs a frequency decomposition using the wavelet transform.

An image pickup optical system (lens unit) 101 has a diaphragm (aperture stop) 101a and a focus lens 101b. The image pickup optical system 101 forms an image of an object (not shown). An image sensor 102 includes a CMOS sensor or a CCD sensor, and photoelectrically converts an image of an object (optical image) formed via the image pickup optical system 101 and outputs image data (electric signals). An A/D converter 103 converts an electric signal (analog signal) output from the image sensor 102 into a digital signal, and outputs the digital signal to an image processor (image processing apparatus) 104.

An image processor (image processing apparatus) 104 includes an image restoration processor 111 and a processor 112. The image restoration processor 111 performs image restoration processing to generate a restored image. The processor 112 performs predetermined processing such as image interpolation processing. The output image from the image restoration processor 111 is in a so-called uneven state in which all color components are not uniform in each pixel. Thus, the processor 112 performs the pixel interpolation processing for the restored image.

First, the image processor 104 obtains an image pickup (or imaging) state (image pickup state information) of the image pickup apparatus 100 from a state detector 107. The state detector 107 can obtain the image pickup state information directly from the system controller 110. Alternatively, the image processor 104 can obtain the image pickup state information on the image pickup optical system 101, for example, from an image pickup optical system controller 106. Next, the image restoration processor 111 selects an image restoration filter according to the image pickup state, from a memory 108, and performs the image restoration processing for the image input to the image processor 104. The data held in the memory 108 may not be the image restoration filter itself, but may be, for example, information on the OTF required to generate the image restoration filter. In this case, the image restoration processor 111 selects information on the OTF according to the image pickup state, from the memory 108, and generates the image restoration filter (or image restoration filter based on the OTF) according to the image pickup state. Then, the image restoration processor 111 performs the image restoration processing for the image input to the image processor 104.

An image recording medium 109 stores the output image processed by the image processor 104 in a predetermined format. A display unit 105 may display an image on which predetermined processing for display has been performed for the image that has received the image restoration processing, or may display an image that has not received any image restoration processing or that has received simple restoration processing. A system controller 110 performs a series of controls. The image pickup optical system controller 106 mechanically drives the image pickup optical system 101 based on an instruction from the system controller 110.

An aperture diameter of the diaphragm 101a is controlled by the imaging state setting of the F-number. The position of the focus lens 101b is controlled by an unillustrated autofocus (AF) mechanism or a manual focus mechanism for focusing according to the object distance. The image pickup optical system 101 may include an optical element such as a low-pass filter and an infrared cutting filter. When a device that affects the characteristic of the OTF, such as the low-pass filter, is used, it needs to be considered when the image restoration filter is created. The infrared cutting filter also affects each of the RGB channel PSFs, particularly the R channel PSF, which is the integral value of the PSF of the spectral wavelength, and thus it needs to be considered when the image restoration filter is created.

In this embodiment, the image pickup optical system 101 is configured as part of the image pickup apparatus 100 and integrated with the image pickup apparatus body, but the present invention is not limited to this embodiment. The present invention is also applicable to an image pickup system including an image pickup apparatus body and an image pickup optical system (interchangeable lens) detachable from the image pickup apparatus body, such as a single-lens reflex camera.

Figure 2:
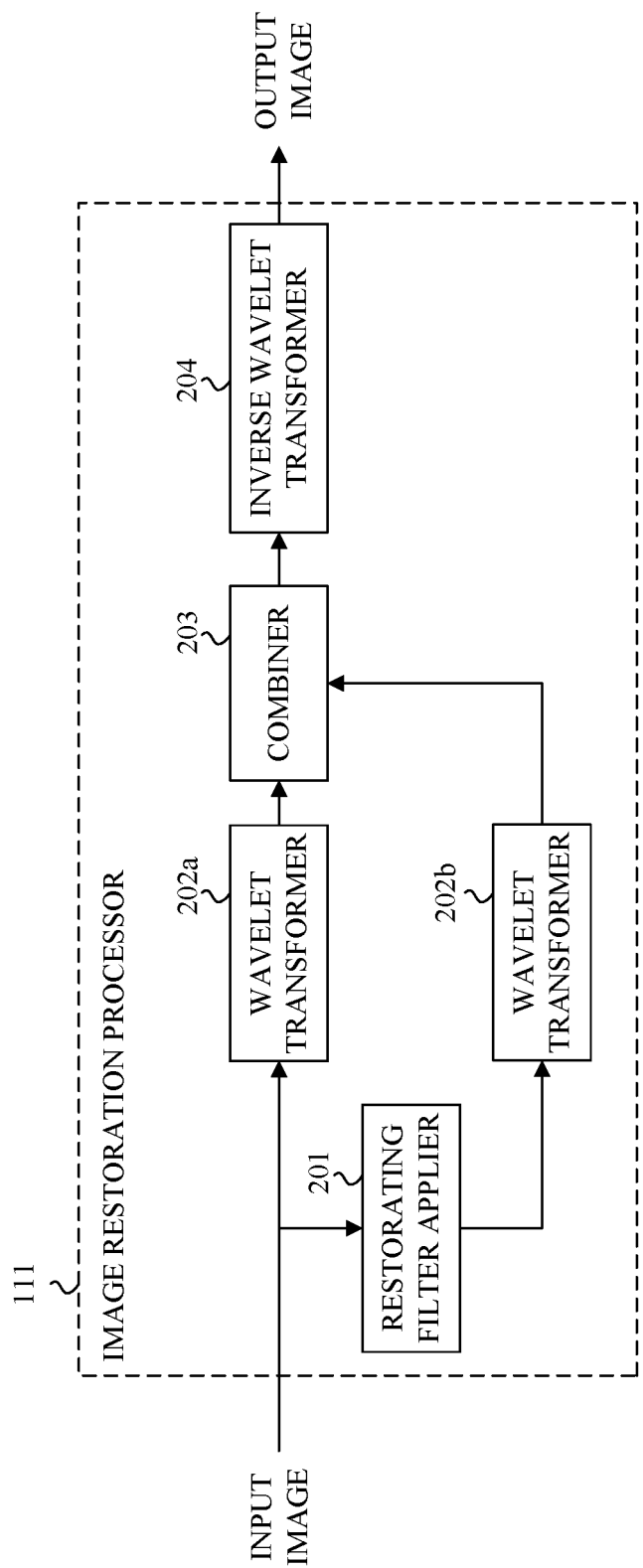
FIG. 2 is a block diagram of an image restoration processor according to a first embodiment.

Referring now to FIG. 2, a description will be given of a configuration of the image restoration processor 111 according to this embodiment. FIG. 2 is a block diagram of the image restoration processor 111. The image restoration processor 111 includes a restoration filter applier (correction unit) 201, wavelet transformers (decomposition unit) 202a and 202b, a combiner (combination unit) 203, and an inverse wavelet transformer (generation unit) 204.

The restoration filter applier 201 applies the image restoration filter to the image to be input to the image restoration processor 111 and generates the restored image. That is, the restoration filter applier 201 corrects first image data (captured image, input image) acquired via the image pickup optical system 101 using the image restoration filter, and corrects second image data (restored image). Herein, the image restoration filter is a filter generated based on the characteristic of the image pickup optical system 101.

The wavelet transformer 202a decomposes a frequency of the input image by performing a wavelet transform for the input image. The wavelet transformer 202b decomposes the frequency of the restored image by performing the wavelet transform for the restored image generated by applying the image restoration filter to the input image. That is, the wavelet transformers 202a and 202b convert each of the first image data and the second image data into a plurality of frequency components including a first frequency component (high-frequency band) and a second frequency component (low-frequency band). The wavelet-transformed values (frequency components) of the wavelet transformers 202a and 202b are output to the combiner 203.

The combiner 203 combines the frequency component output from the wavelet transformer 202a and the frequency component output from the wavelet transformer 202b with each other, and outputs a combined wavelet-transformed value. That is, the combiner 203 combines the first frequency component of the first image data and the first frequency component of the second image data with each other.

The inverse wavelet transformer 204 inversely wavelet-transforms the combined wavelet-transformed value and generates an output image. That is, the inverse wavelet transformer 204 generates third image data (output image) based on the plurality of frequency components including the first frequency component combined by the combiner 203 and the second frequency component of the second image data.

Figure 3:
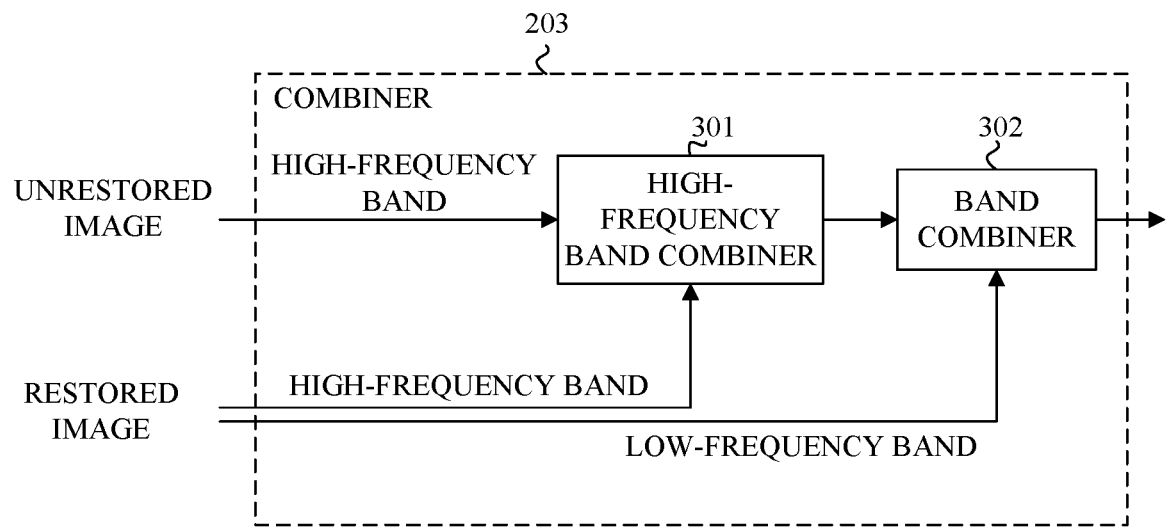
FIG. 3 is a block diagram of a combiner according to each embodiment.
Figure 4:
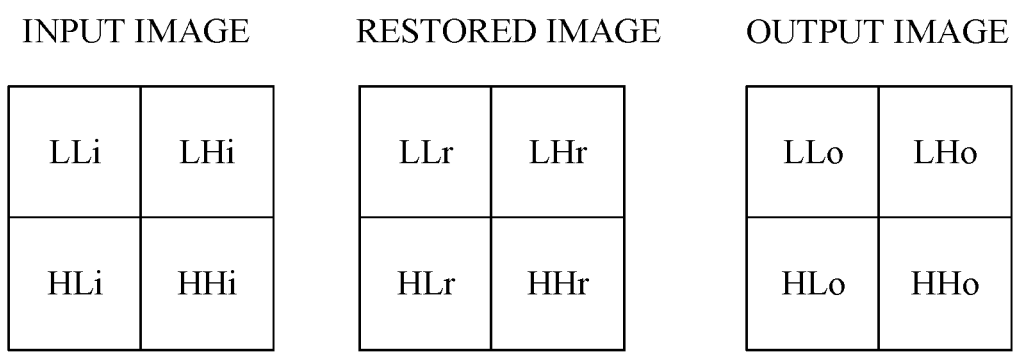
FIG. 4 explains the combiner according to each embodiment.

Referring now to FIGS. 3 and 4, a description will be given of image combining processing performed by the combiner 203 according to this embodiment. FIG. 3 is a block diagram of the combiner 203. FIG. 4 explains the combiner 203. As illustrated in FIG. 3, the combiner 203 includes a high-frequency band combiner 301 and a band combiner 302. The high-frequency band combiner 301 receives, as an input signal, a high-frequency component (high-frequency band) obtained by decomposing, through the wavelet transform, the frequencies of the input image (unrestored image) to the image processor 104 and the restored image obtained by applying the restoration filter to the input image.

As to high-frequency components obtained by the wavelet transform, assume that the input image has $HHi$, $HLi$, and $LHi$, the restored image has $HHr$, $HLr$, $LHr$, and the combined output image has $HHo$, $HLo$, $LHo$, as illustrated in FIG. 4. Then, the high-frequency band combiner 301 combines the high-frequency component of the input image and the high-frequency component of the restored image based on the following expressions (6), (7), and (8).

$$HHo = HHi + \alpha(HHr - HHi) \quad (6)$$

$$HLo = HLi + \alpha(HLr - HLi) \quad (7)$$

$$LHo = LHi + \alpha(LHr - LHi) \quad (8)$$

A change amount between the pre-restoration and the post-restoration or a restoration effect amount can be calculated from $HHr - HHi$ in the second term on the right side of the expression (6). The restoration effect amount of the high-frequency component in the image restoration processing can be controlled by multiplying by a coefficient α determined in advance in consideration of the noise amount during the image restoration processing and by adding it to the input image (pre-restoration image). If the high-frequency component is further decomposed into a plurality of frequency components, the coefficient α may be set for each frequency component.

As to low-frequency components whose frequencies are decomposed by the wavelet transform, the input image has LLi, the restored image has LLr, and the combined output image has LLo, as illustrated in FIG. 4. Then, the band combiner 302 adopts the low-frequency component LLr of the restored image as the combined low-frequency component LLo based on the following expression (9).

$$LLo=LLr \quad (9)$$

The band combiner 302 in the combiner 203 combines bands of the high-frequency component combined as described above and the low-frequency component of the restored image. After that, the inverse wavelet transformer 204 generates an output image in which frequency components are reconstructed into an image by applying the inverse wavelet transform to the band-combined image.

Thus, this embodiment decomposes the frequencies of the pre-restoration and post-restoration images, and combines the frequency components of the pre-restoration and post-restoration images by changing the combination ratio for each band. Thereby, the restoration effect amount can be controlled for each frequency band only by designing or storing a single image restoration filter to be applied by the restoration filter applier 201 without redesigning or storing the image restoration filter. Further, in suppressing the restoration effect amount in the high-frequency band of the image, this embodiment can prevent the restoration effect amount from being suppressed in the low-frequency band, and suppress the noise increase in the high-frequency band while maintaining the restoration effect in the frequency band.

Figure 5:
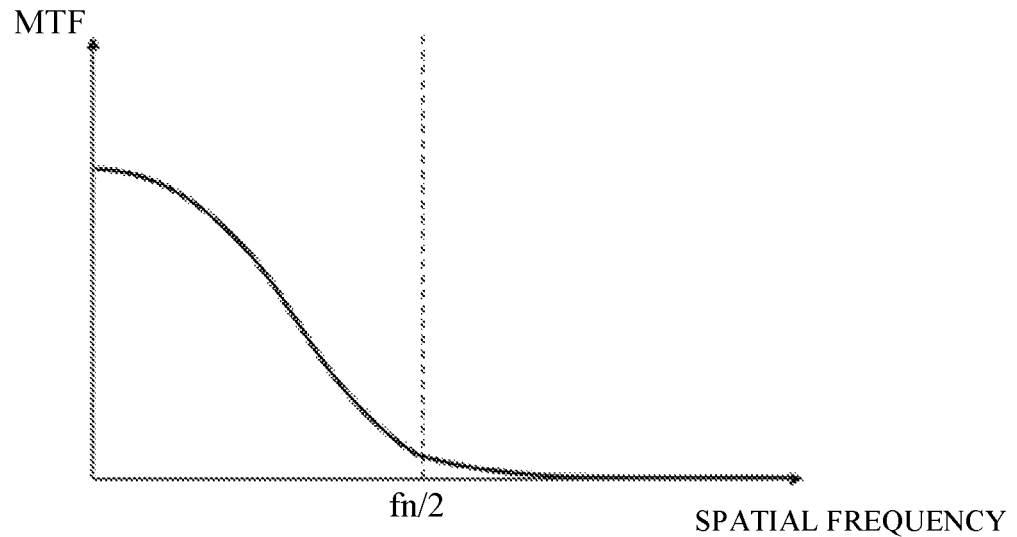
FIG. 5 is an illustrative frequency response of an image pickup optical system according to the first embodiment.
Figure 6:
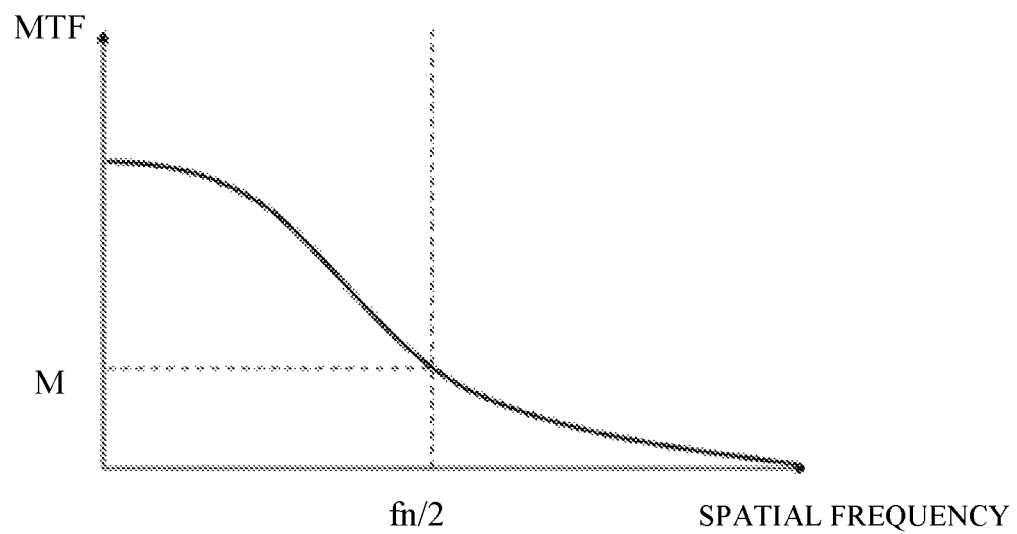
FIG. 6 is an illustrative frequency response of the image pickup optical system according to the first embodiment.
Figure 7:
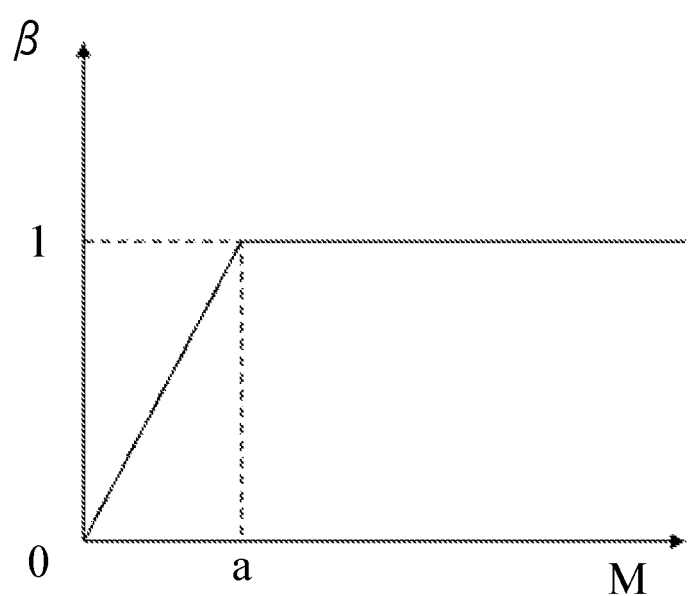
FIG. 7 explains a method for determining a coefficient $\beta$ according to the first embodiment.

Referring now to FIGS. 5 to 7, a description will be given of a case where the frequency response of the MTF of the lens (image pickup optical system 101) is low in the high-frequency band. FIGS. 5 and 6 illustrate illustrative frequency responses of the image pickup optical system 101, and a case where the frequency response of the MTF of the image pickup optical system 101 is low in the high-frequency band. In FIGS. 5 and 6, the abscissa axis represents the spatial frequency and the ordinate axis represents the MTF. FIG. 7 explains a method for determining the coefficient β. In FIG. 7, the abscissa axis indicates the MTF evaluation value (M), and the ordinate axis indicates the coefficient β.

As illustrated in FIG. 5, when the frequency response is low in the high-frequency band, the restoration effect cannot be obtained even when the image restoration filter is applied, and a phenomenon occurs in which the image quality degradation due to the noise increase becomes more influential than the restoration effect. Therefore, in this embodiment, the high-frequency band combiner 301 determines the combination ratio using the following expressions (10), (11), and (12) based on the OTF information of the lens (image pickup optical system 101) used to capture the input image.

$$HHo=HHi+\alpha\beta(HHr-HHi) \quad (10)$$

$$HLo=HLi+\alpha\beta(HLr-HLi) \quad (11)$$

$$LHo=LHi+\alpha\beta(LHr-LHi) \quad (12)$$

Herein, as illustrated in FIG. 6, the coefficient β is determined based on the MTF evaluation value M of the lens at half the frequency (fn/2) of the Nyquist frequency (sensor Nyquist frequency) fn of the image sensor 102 used in the image pickup apparatus 100.

As illustrated in FIG. 7, when the MTF evaluation value M is larger than the predetermined value a, the coefficient β is set to 1 since the frequency response is sufficient in the high-frequency band, and the restoration effect amount is not suppressed. On the other hand, when the MTF evaluation value M is smaller than the predetermined value a, the restoration effect amount is suppressed by setting the value of the coefficient β to 0≤β<1 because the frequency response is insufficient in the high-frequency band. This embodiment can thus suppress the phenomenon in which no restoration effect is obtained and the image degradation becomes remarkable due to the noise increase in the lens having a low frequency characteristic in the high-frequency band by changing the combination ratio of the pre-restoration and post-restoration images in accordance with the OTF of the lens.

This embodiment discusses using the wavelet transform for the band decomposer of the image. However, the band decomposer of the image according to the present invention is not limited to the wavelet transform. The present invention is also applicable, for example, to a band divider including a variety of band-pass filters.

While this embodiment combines the input image and the restored image with each other only for the high-frequency component, the present invention is not limited to this embodiment. For all the frequency components, the frequency components of the input image and the restored image may be combined. Then, a similar effect can be obtained by setting the coefficient α such that the ratio of the restored image to the input image is higher in the low-frequency component than that in the high-frequency component.

Second Embodiment

Next follows a description of a second embodiment according to the present invention. This embodiment is different from the first embodiment in having an image restoration processor 111a instead of the image restoration processor 111. The basic configuration of the image pickup apparatus according to this embodiment is the same as that of the image pickup apparatus 100 according to the first embodiment described with reference to FIG. 1, and a description thereof will be omitted.

Figure 8:
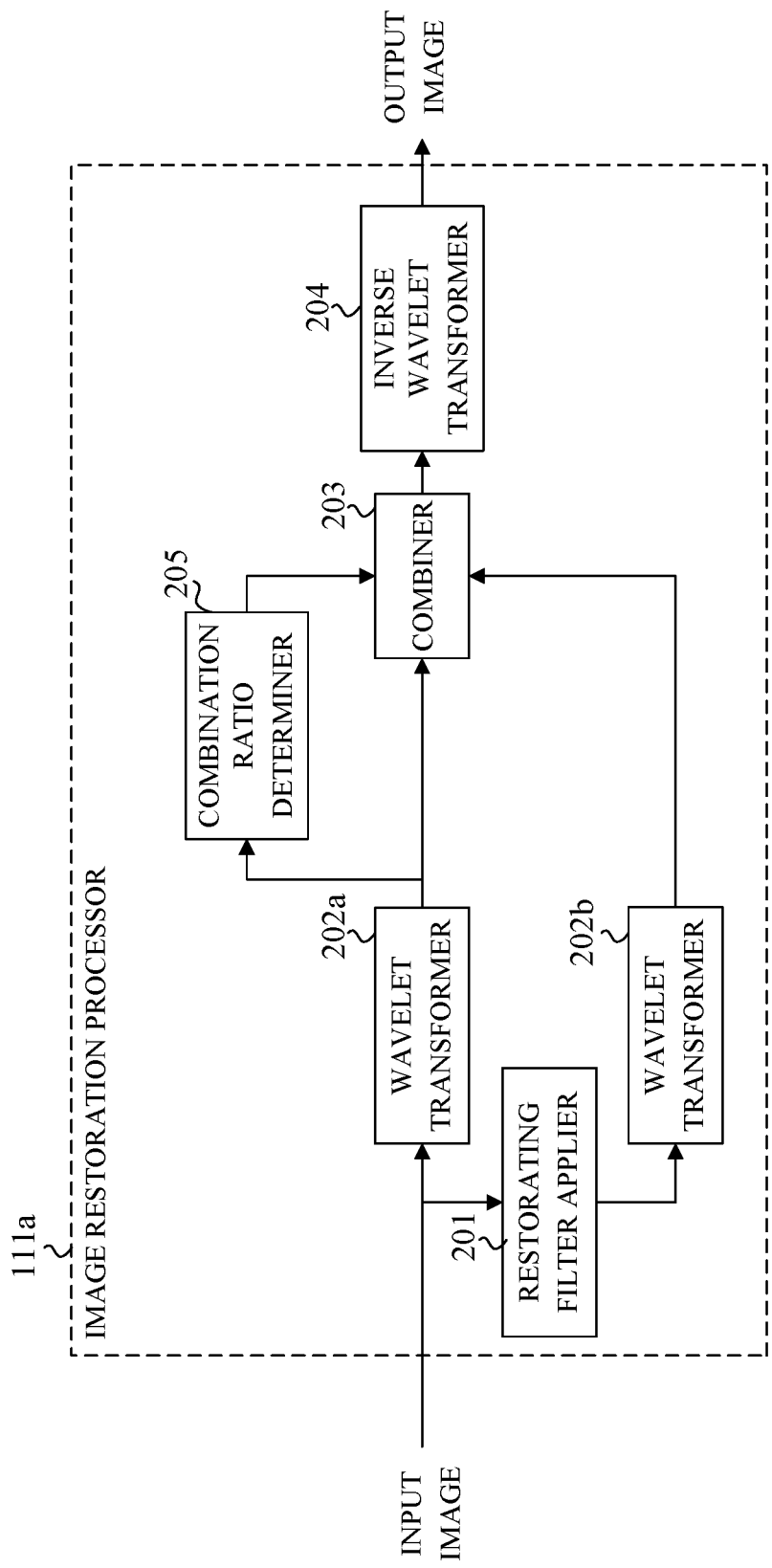
FIG. 8 is a block diagram of an image restoration processor according to the second embodiment.

Referring now to FIG. 8, a description will be given of a configuration of the image restoration processor 111a according to this embodiment. FIG. 8 is a block diagram of the image restoration processor 111a. The image restoration processor 111a is different from the image restoration processor 111 according to the first embodiment in that the image restoration processor 111a includes a combination ratio determiner (determination unit) 205. The combination ratio determiner 205 calculates a combination ratio between a high-frequency component (first frequency component) of the input image (first image data) and a high-frequency component (first frequency component) of the restored image (second image data). The other configuration of the image restoration processor 111a is the same as that of the image restoration processor 111 according to the first embodiment, and a description thereof will not be repeated.

Figure 9:
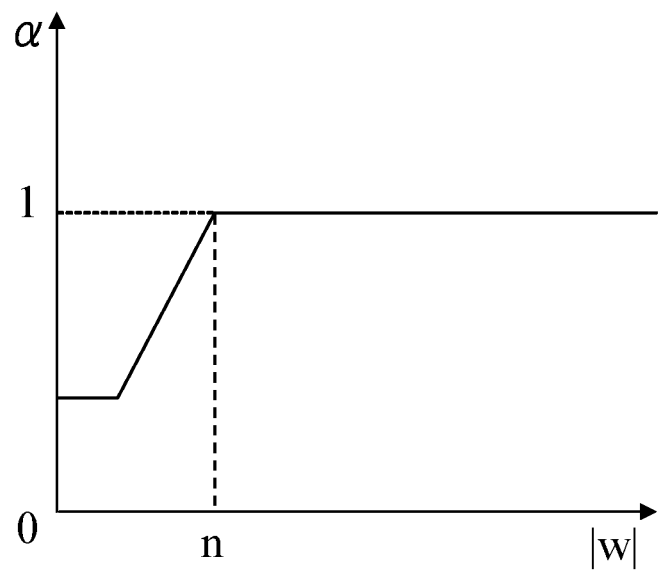
FIG. 9 explains a method for determining a coefficient $\alpha$ according to a second embodiment.

The wavelet-transformed value (first frequency component or high-frequency component) output from the wavelet transformer 202a is input into the combiner 203 and the combination ratio determiner 205. FIG. 9 explains a method for determining the combination ratio (coefficient α). In FIG. 9, the abscissa axis indicates a magnitude of the high-frequency component, and the ordinate axis indicates the coefficient α.

As illustrated in FIG. 9, the combination ratio determiner 205 determines the combination ratio (coefficient α) of the high-frequency component in the combiner (the image combiner) 203 in accordance with the magnitude of the high-frequency component obtained when the frequency of the input image (first image data) is decomposed. The components of the image included in the high-frequency component when the frequency of the image is decomposed have edge regions and noises having high contrasts. Among the high-frequency components including edge regions and noises, those having large magnitudes are edges having strong edge intensities or large luminance gradients relative to the peripheral pixels. On the other hand, the magnitudes of random noises such as white noises included in the image have values smaller than those of the edges having the strong edge intensities.

Thus, as illustrated in FIG. 9, this embodiment determines that the frequency component having a value larger than the predetermined value n is to be an edge, in accordance with the magnitude |w| of the high-frequency component of the image, and sets the coefficient α to 1. In addition, this embodiment determines that the frequency component having a value smaller than the predetermined value n includes noises, and sets the coefficient α to a value in the range of 0≤α<1, thereby suppressing the restoration effect amount and the noise increase caused by applying the restoration filter in the image restoration processing.

Figure 10:
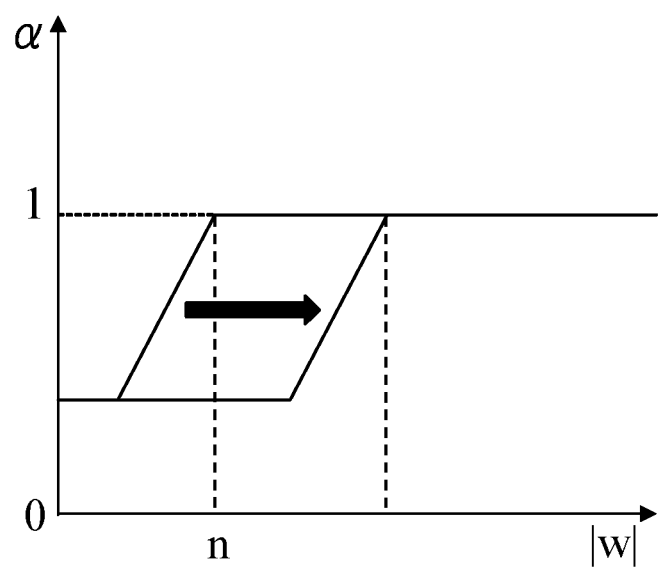
FIG. 10 explains a method for determining a coefficient $\alpha$ according to the ISO speed in the second embodiment.

The noise amplitude included in a captured image generally increases in proportion to the ISO speed used for imaging. Thus, as illustrated in FIG. 10, this embodiment changes a threshold applied to the amplitude of the frequency component in accordance with the ISO speed for the imaging condition of the input image. FIG. 10 explains a method of determining the combination ratio (coefficient α) according to the ISO speed. In FIG. 10, the abscissa axis represents the magnitude |w| of the high-frequency component, and the ordinate axis represents the coefficient α.

Thereby, the combination ratio (coefficient α) between the high-frequency components of the input image and the restored image can be changed according to the noise amplitude that changes according to the ISO speed. Therefore, this embodiment can suppress the gain amount applied to high-frequency components including noises without suppressing the gain amount applied to the high-frequency components other than the noises.

The coefficient α thus determined, the high-frequency component of the input image, and the high-frequency component of the restored image obtained by applying the image restoration processing to the input image are input to the combiner 203. Then, the high-frequency band combiner 301 in the combiner 203 performs the combination processing based on the expressions (6), (7), and (8). Hence, this embodiment can suppress the restoration effect amount for a region including noises among the high-frequency components, and applies the image restoration processing to the other edge regions without suppressing the restoration effect amount.

Next, the band combiner 302 combines with each other the bands of the high-frequency component obtained by decomposing the frequencies of the input image and the restored image and combining them as described above, and the low-frequency component of the restored image. Next, the inverse wavelet transformer 204 applies the inverse wavelet transform to the combined frequency component of the input image and the restored image by the combiner 203, reconstructs the image, and generates (acquires) an output image. The output image thus obtained controls the restoration effect amount by the edge intensity of the input image. Therefore, the image restoration processing is available that suppresses the noise increase while maintaining the restoration effect in the high-frequency band. As a result, it is possible to acquire a restored image better than the prior art that uniformly controls the restoration effect amount in the frequency band.

Each embodiment treats the application of the image restoration filter as the image restoration processing, but the present invention is not limited to this embodiment. According to the present invention, for example, other processing such as distortion correction processing, peripheral light amount correction processing, and noise reduction processing, can be combined before, after, or during the flow of this embodiment, and treated as the image restoration processing.

Each embodiment can provide an image processing apparatus, an image pickup apparatus, an image processing method, a program, and a storage medium, each of which can provide a good image while suppressing the noise increase with a low processing load.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention provides an image processing apparatus, an image pickup apparatus, an image processing method, and a storage medium, each of which can provide a good image while suppressing the noise increase with a low processing load.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107827, filed on Jun. 10, 2019, which is hereby incorporated by reference herein in its entirety.

What is claimed is:

1. An image processing apparatus comprising:
   a correction unit configured to correct first image data acquired via an image pickup optical system and to generate second image data using a filter generated based on a characteristic of the image pickup optical system;
   a decomposition unit configured to decompose each of the first image data and the second image data into a first frequency component and a second frequency component;
   a combination unit configured to combine the first frequency component of the first image data and the first frequency component of the second image data with each other; and
   a generation unit configured to generate third image data based on a frequency component including the first frequency component combined by the combination unit and the second frequency component of the second image data,
   wherein at least one processor or circuit is configured to perform a function of at least one of the units.

2. The image processing apparatus according to claim 1, wherein the first frequency component is a frequency component higher than the second frequency component.

3. The image processing apparatus according to claim 1, wherein the filter is an image restoration filter generated based on the characteristic of the image pickup optical system.

4. The image processing apparatus according to claim 1, wherein the decomposition unit performs a wavelet transform for each of the first image data and the second image data.

5. The image processing apparatus according to claim 4, wherein the generation unit performs an inverse wavelet transform for the frequency component including the first frequency component combined by the combination unit and the second frequency component of the second image data.

6. The image processing apparatus according to claim 1, further comprising a determination unit configured to determine a combination ratio between the first frequency component of the first image data and the first frequency component of the second image data.

7. The image processing apparatus according to claim 6, wherein the determination unit determines the combination ratio based on an optical transfer function.

8. The image processing apparatus according to claim 6, wherein the determination unit determines the combination ratio based on the first frequency component of the first image data.

9. The image processing apparatus according to claim 6, wherein the determination unit determines the combination ratio based on ISO speed.

10. An image pickup apparatus comprising:
    an image sensor; and
    the image processing apparatus according to claim 1.

11. An image processing apparatus comprising:
    a correction unit configured to correct first image data acquired via an image pickup optical system and to generate second image data using a filter generated based on a characteristic of the image pickup optical system;
    a decomposition unit configured to decompose each of the first image data and the second image data into a plurality of frequency components;
    a combination unit configured to combine a frequency component of the first image data and a frequency component of the second image data in each frequency component; and
    a generation unit configured to generate third image data based on the frequency component combined by the combination unit,
    wherein at least one processor or circuit is configured to perform a function of at least one of the units,
    wherein the plurality of frequency components include a first frequency component and a second frequency component that is a frequency component lower than the first frequency component, and
    wherein the combination unit combines the frequency component of the first image data and the frequency component of the second image data such that a ratio of the first frequency component of the second image data to the first frequency component of the first image data is larger than a ratio of the second frequency component of the second image data to the second frequency component of the first image data.

12. The image processing apparatus according to claim 11, wherein the filter is an image restoration filter generated based on the characteristic of the image pickup optical system.

13. The image processing apparatus according to claim 11, wherein the decomposition unit performs a wavelet transform for each of the first image data and the second image data.

14. The image processing apparatus according to claim 13, wherein the generation unit performs an inverse wavelet transform for the frequency component including the first frequency component combined by the combination unit and the second frequency component of the second image data.

15. An image processing method comprising:
    correcting first image data acquired via an image pickup optical system and to generate second image data using a filter generated based on a characteristic of the image pickup optical system;
    decomposing each of the first image data and the second image data into a first frequency component and a second frequency component;
    combining the first frequency component of the first image data and the first frequency component of the second image data with each other; and
    generating third image data based on a frequency component including the combined first frequency component and the second frequency component of the second image data.

16. A non-transitory computer-readable storage medium storing a program for causing a computer to execute the image processing method according to claim 15.

17. An image processing method comprising
    correcting first image data acquired via an image pickup optical system and to generate second image data using a filter generated based on a characteristic of the image pickup optical system;
    decomposing each of the first image data and the second image data into a plurality of frequency components;

combining a frequency component of the first image data and a frequency component of the second image data in each frequency component; and generating third image data based on the combined frequency component, wherein the plurality of frequency components include a first frequency component and a second frequency component that is a frequency component lower than the first frequency component, and wherein the combination unit combines the frequency component of the first image data and the frequency component of the second image data such that a ratio of the first frequency component of the second image data to the first frequency component of the first image data is larger than a ratio of the second frequency component of the second image data to the second frequency component of the first image data.

* * * * *